April 15, 1969  F. J. WENNERBERG  3,438,435
HEAT EXCHANGE PLATE
Filed Dec. 23, 1966
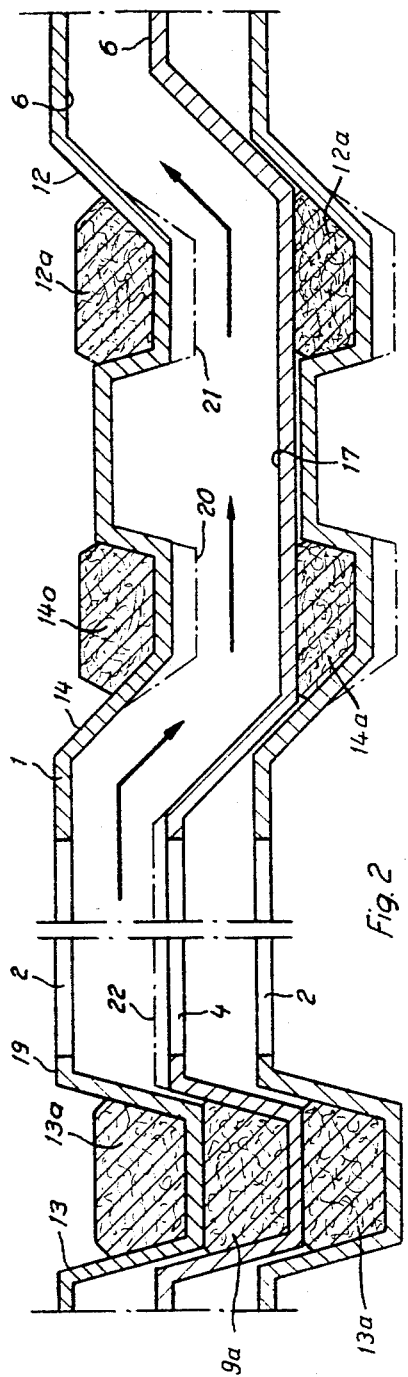
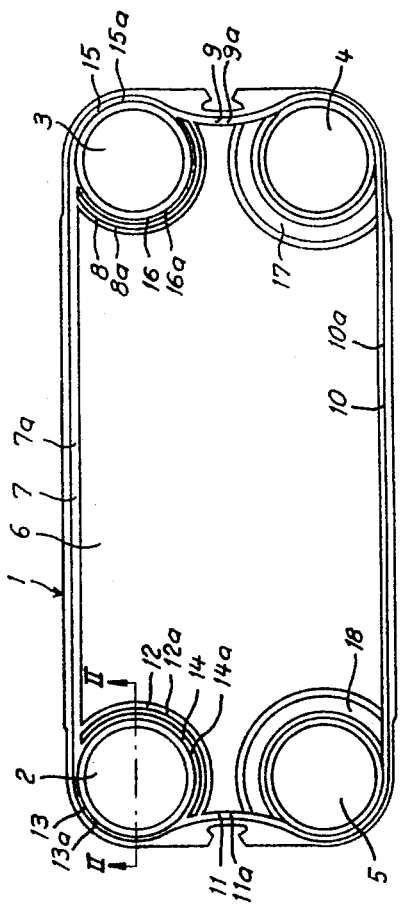
INVENTOR.
Fritz Johan Wennerberg
BY
Davis, Hopie, Faithfull & Hapgood United States Patent Office 3,438,435
Patented Apr. 15, 1969

3,438,435
HEAT EXCHANGE PLATE
Fritz J. Wennerberg, Lund, Sweden, assignor to Alfa-Laval AB, Tumba, Sweden, a corporation of Sweden
Filed Dec. 23, 1966, Ser. No. 604,213
Claims priority, application Sweden, Dec. 29, 1965, 16,869
Int. Cl. F28f 3/08
U.S. Cl. 165—167          3 Claims

ABSTRACT OF THE DISCLOSURE

A heat exchange plate has a first impressed groove and first gasket means therein surrounding the heat exchange surface, the plate being provided with at least one hole within the confines of the first gasket means and with at least one hole outside said confines for passage of the respective heat exchange media, and an additional impressed groove and additional gasket means therein surround each hole outside said confines, whereby the grooves and gasket means include groove portions and gaskets therein extending in side-by-side relation between the heat exchange surface and each said hole located outside the confines of the first gasket means. The heat exchange plate is characterized principally in that the gaskets in the side-by-side portions of the grooves are thinner than the gasket means in the other portions of the grooves, and the parts of the plate forming the grooves are adapted to hold the gasket means, including the thinner gaskets, in sealing relation against opposing parts of an adjacent plate which form the bottoms of the grooves in the adjacent plate, whereby throttling of the flow through the interspace between adjacent plates is reduced or avoided.

The disclosure

A plate heat exchanger comprises a pack of thin plates clamped together and provided with impressed grooves and endless gaskets in the grooves. A first groove and gasket surround the heat exchanging surface of the plate and one or more through-holes therein; and outside the confines of this first gasket are one or more further through-holes in the plate and each surrounded by a groove and its gasket. The grooves in the plates are arranged so that when the plates are clamped together in a pack, the grooves and the gaskets in one plate coact with the backs of the impressed grooves in an adjacent plate, whereby the pack defines between the plates a series of spaces for the media which are to exchange heat and also defines passages between alternate spaces by surrounding and sealingly connecting, in each interspace, two through-holes situated opposite each other. In this way, one passage connects one interspace for one of said media with the next interspace for the same medium, by-passing the intermediate interspace for the other medium. The through-holes in the heat exchanging surfaces of the plates, which are not surrounded by a groove and an endless gasket therein, form passages for flow of the heat exchange media to and from the respective interspaces between the plates.

Of course, in these plate heat exchangers it is desirable to have uniform plates, i.e., plates which are identically alike. In this connection, the through-holes are left out of consideration, for these holes are made afterwards, dependent upon the desired flow of the media in the pack of plates. For example, if it is desired that the media flow in counter-current in single paths from one end of the pack to the other, each plate needs only two through-holes placed in different ways, although the plates are still considered uniform. It is more usual, however, that the media are caused to flow in counter-current and alternately in a plurality of parallel paths, which is repeated two or more times in the pack of plates. In these cases two uniform plates are used, but the uniformity here is even greater, for all the holes are also arranged in the same way. This kind of plate is the most frequently used. Usually the plates have a rectangular form and are provided with through-holes in each corner, but they may have another form, such as circular.

With respect to flow of the media through the interspaces between the plates from an inlet hole to an outlet hole, a distinction is made between two main types of flow. One type of flow is diagonally or diametrically over the plate, and another type of flow is parallel to one side of the plate. In the first case, the plate is rectangular or circular, and in the second case it is usually rectangular. The inlet and outlet holes in a plate according to the second case are arranged at each end of a long side of the plate.

For the sake of simplicity, only rectangular and uniform plates having through-holes in the four corners will be discussed in the following. These plates can be of two kinds. In one kind, the upper half of the plate is an image of the lower half, and the left half is an image of the right half. When plates of this kind are put together in a pack, the gaskets must be of two kinds, alternating between the plates, for obtainment of a diagonal flow downwards or upwards, alternately following diagonals crossing each other. The other kind is a plate the upper half of which is an image of the lower half, but its left half is only partly an image of its right half. Plates of this kind can be used only for flowing of the media parallel to one of the edges of the plate, and this mode of flow is obtained by means of gaskets arranged in the same way in all of the plates, alternate plates in the pack, however, being turned 180° in their own plane.

In plate heat exchangers having plates of the kind described above, all the grooves impressed in the plates have the same depth, and all the gaskets in the grooves have the same thickness, which means that the distance between the plates in the packs of plates always is the same. From this, it could be assumed that the media, when flowing from the area of an inlet hole into the interspace or from the latter to the area of an outlet hole, are not subjected to any throttling. However, closer consideration shows that they are in fact subjected to throttling, and this is because the media in these areas must pass between plates provided with impressed grooves arranged to coact with gaskets for forming the closed interspaces and the closed passages. At these throttling areas, therefore, a high flow velocity and a relatively great pressure drop occur. The high flow velocity may lead to increased corrosion, as when the plates are made of aluminum or brass and one of the flow media is salt water, and the greater pressure drop causes an increased expenditure of pumping energy.

An object of the present invention is to eliminate the previously described drawbacks and to provide a plate of the so-called "uniform type" by means of which these drawbacks are minimized or eliminated.

One embodiment of the present invention will be described in the following with reference to the accompanying drawings, in which:

FIG. 1 is a face view of a rectangular plate having through-holes in all of its four corners, and FIG. 2 is an enlarged sectional view of a portion of the plate in FIG. 1 and two underlying plates, the section being taken along the line II—II in FIG. 1.

In FIG. 1, the left half of the plate 1 is an image of the right half, but the upper half of the plate is only partly an image of the lower half. The difference will be apparent from the following.

When assembling the plates in a pack, as shown in FIG. 2, every second plate is turned 180° in its own plane.

Plate 1 in FIGS. 1 and 2 is provided with four through-holes 2, 3, 4 and 5; and due to the 180° turning of every second plate, hole 4 in FIG. 2 is situated between holes 2 in the two adjacent plates. Each plate has a heat exchanging surface 6 which, together with holes 4 and 5 arranged in this surface, is surrounded by a groove 7, 8, 9, 10, 11 and 12 and an endless gasket arranged in the groove, the corresponding parts of the gasket being designated 7a, 8a, 9a, 10a, 11a and 12a. Holes 2 and 3 in the plate are spaced from the heat exchanging surface 6 and are outside the confines of gasket 8a through 12a, hole 2 being surrounded by a groove 13 and 14 having gaskets 13a and 14a, and hole 3 being surrounded by another groove 15 and 16 having gaskets 15a and 16a. Thus, between the heat exchanging surface 6 and through-holes 2 and 3, respectively, there are two grooves 12 and 14 having gaskets 12a and 14a, and two grooves 8 and 16 having gaskets 8a and 16a. Through-holes 4 and 5 are only partly surrounded by grooves 9 and 10 having gaskets 9a and 10a, and by grooves 10 and 11 having gaskets 10a and 11a, respectively; and their grooved surrounding is completed by broad grooves 17 and 18, respectively, which have the same depth as grooves 9, 10 and 11 but are free of gaskets, thereby enabling media flowing through holes 4 and 5, respectively, to flow to or from the heat exchanging surface 6.

Grooves 7, 15, 9, 10, 11 and 13 have the same depth measured from the main plane 19 of the plate, and the gaskets therein have the same thickness. However, grooves 14 and 12 and grooves 8 and 16 are shallower than the previously mentioned grooves, and the gaskets therein are shallower than the gaskets in the previously mentioned grooves, in accordance with the present invention. The broken lines 20 and 21 in FIG. 2 show to what extent grooves 14 and 12 should have been pressed to be situated at the same distance from the main plane of the plate as, for example, groove 13. The broad groove 17 in FIG. 1, which also can be seen in FIG. 2, has a flat bottom that is slightly broader than the width occupied by grooves 14 and 12 situated above.

Holes 2 and 4 in FIG. 2 as well as holes 3 and 5 (not shown in FIG. 2) are made in plain portions of the plates. These plain portions around holes 2 and 3 are situated in the same plane as the main plane 19 of the plate; but according to the invention the plain portions around holes 4 and 5 are situated slightly lower than the main planes 19 of the plate, as is shown by the broken line 22 in FIG. 2, which line extends in the same plane as plane 19.

By making grooves 14 and 12 shallower and making groove 17 plain and broad, and by pressing the plain portion of the plate around hole 4 downwardly, the present invention provides the media when flowing from holes 4 according to the arrows in FIG. 2, with a wider channel to flow through on the way to the heat exchanging surface 6 than would otherwise be the case. In this channel, the media otherwise would be subjected to throttling and the resulting pressure drop and increase of the flow velocity, which can now be avoided or substantially decreased.

If the halves of the plates had been images of each other also in the sense that in FIG. 1 the upper half had been an image of the lower half, the broad grooves 17 and 18 would have been replaced by grooves corresponding to grooves 8 and 16 and grooves 12 and 14, respectively, but without gaskets. In that case, the bottom of groove 17 would have had a protuberance in the middle, corresponding to the protuberance between gaskets 14a and 12a in the plate situated above, with reference to FIG. 2. This would have caused extra throttling of the medium on its way from hole 4 to the heat exchanging surface 6, which throttling is now avoided due to the plain bottom of groove 17.

For the sake of simplicity, it has been assumed in the description above that all grooves with gaskets in the plate, except those which have been changed according to the present invention, are impressed to the same depth measured from the main plane of the plate, and that all gaskets have the same thickness. However, this is not necessary, for the plates may have other main planes than the plain ones, and then the depth of the grooves is measured in another way, for example, so that grooves having the same depth in the plate are those the backs of which are situated att he same distance from the adjacent plate.

I claim:

1. For use in a heat exchanger having a pack of heat exchange plates, a heat exchange plate having a heat exchange surface and through-flow holes, the plate being provided with a first impressed groove and first gasket means therein surrounding said surface, at least one through-flow hole being located within the confines of the first gasket means and at least another through-flow hole being located outside said confines, the plate also having an additional impressed groove and additional gasket means therein surrounding each said hole located outside the confines of the first gasket means, said grooves and gasket means including groove portions and gaskets therein extending in side-by-side relation between said surface and each said hole located outside said confines, said gasket means being adapted to abut and seal against parts of an adjacent plate forming the bottoms of the grooves in the adjacent plate, whereby said pack defines two groups of plate interspaces for flow of the respective heat exchange media, said heat exchange plate being characterized in that said gaskets in said side-by-side portions of the grooves are shallower than the gasket means in the other portions of the grooves, and the parts of the plate forming said side-by-side groove portions are adapted to hold said thinner gaskets in sealing relation against the opposing parts of said adjacent plate.

2. A heat exchange plate according to claim 1, in which the plate is rectangular and has through-flow holes in each of its four corner portions, two of said holes being located adjacent the same edge of the plate and within said confines of the first gasket means, the other holes being located outside said confines, the parts of the plate bordering said two holes and within said confines being in a plane located closer to the plane of the bottom of said first groove adjacent said two holes than is the plane of the parts of the plate bordering said other holes.

3. A heat exchange plate according to claim 1, in which the plate is rectangular and has through-flow holes in each of its four corner portions, two of said holes being located adjacent the same edge of the plate and within said confines of the first gasket means, the other holes being located outside said confines, said side-by-side portions of the grooves being shallower than the other portions of the grooves.

References Cited

UNITED STATES PATENTS 2,623,736  12/1952  Hytte _____ 165—166 X

FOREIGN PATENTS 502,819  3/1939  Great Britain.
63,861  8/1945  Denmark.
725,154  9/1942  Germany.

ROBERT A. O'LEARY, *Primary Examiner.*

THEOPHIL W. STREULE, *Assistant Examiner.*